(12) United States Patent
Asao et al.

(10) Patent No.: US 10,343,713 B2
(45) Date of Patent: Jul. 9, 2019

(54) ELECTRIC POWER STEERING APPARATUS

(71) Applicant: Mitsubishi Electric Corporation, Tokyo (JP)

(72) Inventors: Yoshihito Asao, Tokyo (JP); Akihiko Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/747,164

(22) PCT Filed: Jan. 14, 2016

(86) PCT No.: PCT/JP2016/051019
§ 371 (c)(1),
(2) Date: Jan. 24, 2018

(87) PCT Pub. No.: WO2017/122329
PCT Pub. Date: Jul. 20, 2017

(65) Prior Publication Data
US 2018/0208236 A1 Jul. 26, 2018

(51) Int. Cl.
*B62D 5/04* (2006.01)
*H02P 29/028* (2016.01)
*H02P 25/22* (2006.01)
*G01L 5/22* (2006.01)
*B62D 6/08* (2006.01)

(52) U.S. Cl.
CPC ......... *B62D 5/0481* (2013.01); *B62D 5/0484* (2013.01); *B62D 6/08* (2013.01); *G01L 5/221* (2013.01); *H02P 25/22* (2013.01); *H02P 29/028* (2013.01)

(58) Field of Classification Search
None
See application file for complete search history.

(56) References Cited

U.S. PATENT DOCUMENTS

| 5,448,480 | A | * | 9/1995 | Rauner | G05B 9/03 180/404 |
| 5,747,950 | A | * | 5/1998 | Friedrichsen | B62D 5/003 318/5 |
| 6,885,922 | B2 | * | 4/2005 | Yao | B62D 5/003 701/32.9 |
| 7,433,767 | B2 | | 10/2008 | Takeuchi et al. | |

(Continued)

FOREIGN PATENT DOCUMENTS

JP 3839358 B2 11/2006

*Primary Examiner* — Navid Ziaeianmehdizadeh
(74) *Attorney, Agent, or Firm* — Sughrue Mion, PLLC; Richard C. Turner (57) ABSTRACT

Each of two control units configured in a double system has a CPU, each CPU obtains input information of the control unit of the other CPU, each CPU independently drives an electric motor at a normal time, and continues the motor drive by utilizing the input information of the control unit of the other CPU when an abnormality relating to input information is detected, and when an abnormality relating to information other than input information is detected, the control unit in which the abnormality has occurred controls the electric motor so as to continue the drive or stop the drive in accordance with details of the abnormality, and the control unit on the normal side controls the electric motor so as to at least continue the drive as normal.

16 Claims, 5 Drawing Sheets

(56) References Cited

U.S. PATENT DOCUMENTS

| | | | |
|---|---|---|---|
| 8,099,179 B2* | 1/2012 | Naik | G05B 9/03 180/65.225 |
| 2002/0057070 A1* | 5/2002 | Thomsen | B62D 5/003 318/801 |
| 2002/0093298 A1* | 7/2002 | Walter | B60T 7/042 318/34 |
| 2004/0193344 A1* | 9/2004 | Suzuki | B60T 8/885 701/41 |
| 2005/0159866 A1* | 7/2005 | Takeuchi | B62D 5/003 701/41 |
| 2005/0257992 A1* | 11/2005 | Shiino | B62D 5/04 180/444 |
| 2006/0253726 A1* | 11/2006 | Kukshya | G06F 11/2005 714/4.1 |
| 2008/0067960 A1* | 3/2008 | Maeda | B62D 5/046 318/400.02 |
| 2011/0035108 A1* | 2/2011 | Yamashita | B62D 5/0463 701/41 |
| 2012/0006612 A1* | 1/2012 | Wilson-Jones | B62D 5/0469 180/446 |
| 2013/0299271 A1* | 11/2013 | Endo | B62D 5/046 180/446 |
| 2014/0009093 A1* | 1/2014 | Suzuki | H02P 25/22 318/400.02 |
| 2014/0172236 A1* | 6/2014 | Nishikawa | B62D 5/003 701/42 |
| 2015/0046039 A1* | 2/2015 | Yamano | B62D 5/0463 701/41 |
| 2015/0214882 A1* | 7/2015 | Suzuki | B62D 5/046 318/139 |
| 2015/0239494 A1* | 8/2015 | Fukunaga | H04Q 9/00 701/43 |
| 2015/0298727 A1* | 10/2015 | Kimpara | B62D 5/0484 701/43 |
| 2016/0200355 A1* | 7/2016 | Mori | B62D 5/0484 180/446 |
| 2017/0012569 A1* | 1/2017 | Koseki | H02P 25/22 |
| 2017/0070178 A1* | 3/2017 | Koseki | H02P 27/06 |
| 2017/0104437 A1* | 4/2017 | Suzuki | B62D 5/0475 |
| 2017/0151979 A1* | 6/2017 | Maeda | B62D 5/0457 |
| 2017/0272009 A1* | 9/2017 | Kawamura | B60L 3/04 |
| 2017/0369093 A1* | 12/2017 | Kusatani | H02P 29/024 |

* cited by examiner

ELECTRIC POWER STEERING APPARATUS

CROSS REFERENCE TO RELATED APPLICATIONS

This application is a National Stage of International Application No. PCT/JP2016/051019, filed Jan. 14, 2016, the contents of which are incorporated herein by reference in its entirety.

TECHNICAL FIELD

The present invention relates to an electric power steering apparatus, and in particular, relates to an electric power steering apparatus such that a control unit as a controller that controls a motor is of a redundant configuration.

BACKGROUND ART

As is commonly known, an electric power steering apparatus is configured so as to detect a steering torque applied by a driver to a steering wheel, and cause an electric motor to generate an assist torque commensurate with the detected steering torque, thereby assisting the steering of the driver.

To date, as this kind of electric power steering apparatus, there is an electric power steering apparatus configured so that two sets of independent stator windings are provided in an electric motor, two sets of inverter circuits that can independently drive the two sets of stator windings are provided in a control unit, and the stator windings are individually controlled in concert by the corresponding inverter circuits. This kind of existing electric power steering apparatus is configured so that when an abnormality occurs in one set of stator windings and inverter circuits, driving of the motor is continued using only a normal set formed of the other stator windings and inverter circuits.

Furthermore, there is also an existing electric power steering apparatus such that a failure is more thoroughly prepared for by portions of a control unit other than an inverter circuit also being a double system (for example, refer to Patent Document 1). The existing electric power steering apparatus disclosed in Patent Document 1 is configured to include two sets each of a connection terminal connected to a positive electrode side terminal +B of a battery acting as an external power supply mounted in a vehicle, an input circuit, a CPU (central processing unit), an output circuit, and the like, which form one portion of components of the control unit, and when an abnormality occurs in one of the two sets, motor control can be continued on the other, normal side.

PRIOR ART REFERENCE

Patent Document

Patent Document 1: Japanese Patent No. 3,839,358

DISCLOSURE OF THE INVENTION

Problems to be Solved by the Invention

The existing electric power steering apparatus disclosed in Patent Document 1, as previously described, has a redundant control system that includes two sets each of one portion of components of the control unit, but simply adopting a redundant control system that has two sets of control unit components in this way has a large number of disadvantages in terms of mountability of the electric power steering apparatus in a vehicle, cost, and the like, and the redundant control system needs to be configured with consideration to both cost performance and safety.

Also, when electric motor control is continued using only the other, normal control system when an abnormality occurs in one control system of the redundant control system, drive of the electric motor may be insufficient compared with that at a normal time. However, depending on the cause (details) of the abnormality, there may exist a case in which drive of the electric motor can be continued in a state the same as that at a normal time at which no abnormality occurs, that is, a case in which there is no insufficiency compared with a normal time. Consequently, there is still room for improvement in the existing electric power steering apparatus that includes a redundant control system such that when an abnormality occurs in one set of the redundant control system, the electric motor is consistently controlled using only the other, normal control system, regardless of the cause of the abnormality.

The invention, having been contrived in order to resolve the problems with the previously described kind of existing electric power steering apparatus, has an object of providing an electric power steering apparatus such that control can be continued appropriately in accordance with the details of an occurring abnormality.

Means for Solving the Problems

An electric power steering apparatus according to the invention is an electric power steering apparatus having an electric motor that includes two mutually independent armature windings and assisting steering power of a driver who controls steering of a vehicle using a driving force of the electric motor, characterized in that the electric power steering apparatus includes two control units that drive the electric motor, and each of the two control units includes a power supply circuit, an input circuit into which input information including at least steering torque applied to the steering of the vehicle by the driver is input, an inverter circuit configured so as to drive the electric motor, a drive circuit configured so as to drive the inverter circuit, and a CPU that inputs a control command based on a control amount computed based on the input information output from the input circuit into the drive circuit. The power supply circuit is configured so as to supply power to the control unit to which the power supply circuit itself belongs, and the CPU provided in each of the two control units is configured so as to be able to acquire the input information of the control unit to which the CPU itself does not belong, has an abnormality detecting function of detecting an abnormality related to the input information of the control unit to which the CPU itself belongs and an abnormality related to information other than the input information, and is configured so as to transmit the control command to the drive circuit of the control unit to which the CPU itself belongs at a normal time when none of the abnormalities is being detected. When one CPU of the individual CPUs detects an abnormality related to the input information of the control unit to which the CPU itself belongs, the one CPU that detects an abnormality related to the input information is configured so as to compute a control amount using the input information of the control unit to which the CPU itself does not belong, and transmit a control command based on the computed control amount to the drive circuit in the control unit to which the CPU itself belongs, and the other CPU, which is not detecting an abnormality related to the input information, is configured so as to continuously transmit a control command equivalent to that at the normal time to the drive circuit in the control unit to which the CPU itself belongs. When one CPU of the individual CPUs detects an abnormality related to information other than the input information of the control unit to which the CPU itself belongs, the one CPU that detects an abnormality related to information other than the input information is configured so as to transmit a control command to carry out either a stopping or a continuation of a drive of the electric motor in accordance with details of the detected abnormality to the drive circuit in the control unit to which the CPU itself belongs, the other CPU, which is not detecting an abnormality related to information other than the input information, is configured so as to transmit a control command in accordance with the details of the abnormality detected by the one CPU to the drive circuit in the control unit to which the CPU itself belongs, and the drive circuit provided in each of the two control units is configured so as to drive the inverter circuit to which the drive circuit itself belongs so as to control the electric motor based on the transmitted control command.

Advantage of the Invention

According to the invention, two control units that drive the electric motor are included, and each of the two control units includes a power supply circuit, an input circuit into which input information including at least the steering torque is input, an inverter circuit configured so as to drive the electric motor, a drive circuit configured so as to drive the inverter circuit, and a CPU that inputs a control command based on a control amount computed based on input information from the input circuit into the drive circuit. The power supply circuit is configured so as to supply power to the control unit to which the power supply circuit itself belongs, and the CPU provided in each of the two control units is configured so as to be able to acquire the input information of the control unit to which the CPU itself does not belong, has an abnormality detecting function of detecting an abnormality related to the input information of the control unit to which the CPU itself belongs and an abnormality related to information other than the input information, and is configured so as to transmit the control command to the drive circuit of the control unit to which the CPU itself belongs at a normal time when none of the abnormalities is being detected. When one CPU of the individual CPUs detects an abnormality related to the input information of the control unit to which the CPU itself belongs, the one CPU that detects an abnormality related to the input information is configured so as to compute a control amount using the input information of the control unit to which the CPU itself does not belong, and transmit a control command based on the computed control amount to the drive circuit in the control unit to which the CPU itself belongs, and the other CPU, which is not detecting an abnormality related to the input information, is configured so as to continuously transmit a control command equivalent to that at the normal time to the drive circuit in the control unit to which the CPU itself belongs. When one CPU of the individual CPUs detects an abnormality related to information other than the input information of the control unit to which the CPU itself belongs, the one CPU that detects an abnormality related to information other than the input information is configured so as to transmit a control command to carry out either a stopping or a continuation of a drive of the electric motor in accordance with details of the detected abnormality to the drive circuit in the control unit to which the CPU itself belongs, the other CPU, which is not detecting an abnormality related to information other than the input information, is configured so as to transmit a control command in accordance with the details of the abnormality detected by the one CPU to the drive circuit in the control unit to which the CPU itself belongs, and the drive circuit provided in each of the two control units is configured so as to drive the inverter circuit to which the drive circuit itself belongs so as to control the electric motor based on the transmitted control command. Because of this, even when an abnormality occurs in one of the control units, electric power steering can be appropriately controlled in accordance with the details of the abnormality occurring.

DESCRIPTION OF EMBODIMENTS

First Embodiment

Figure 1:
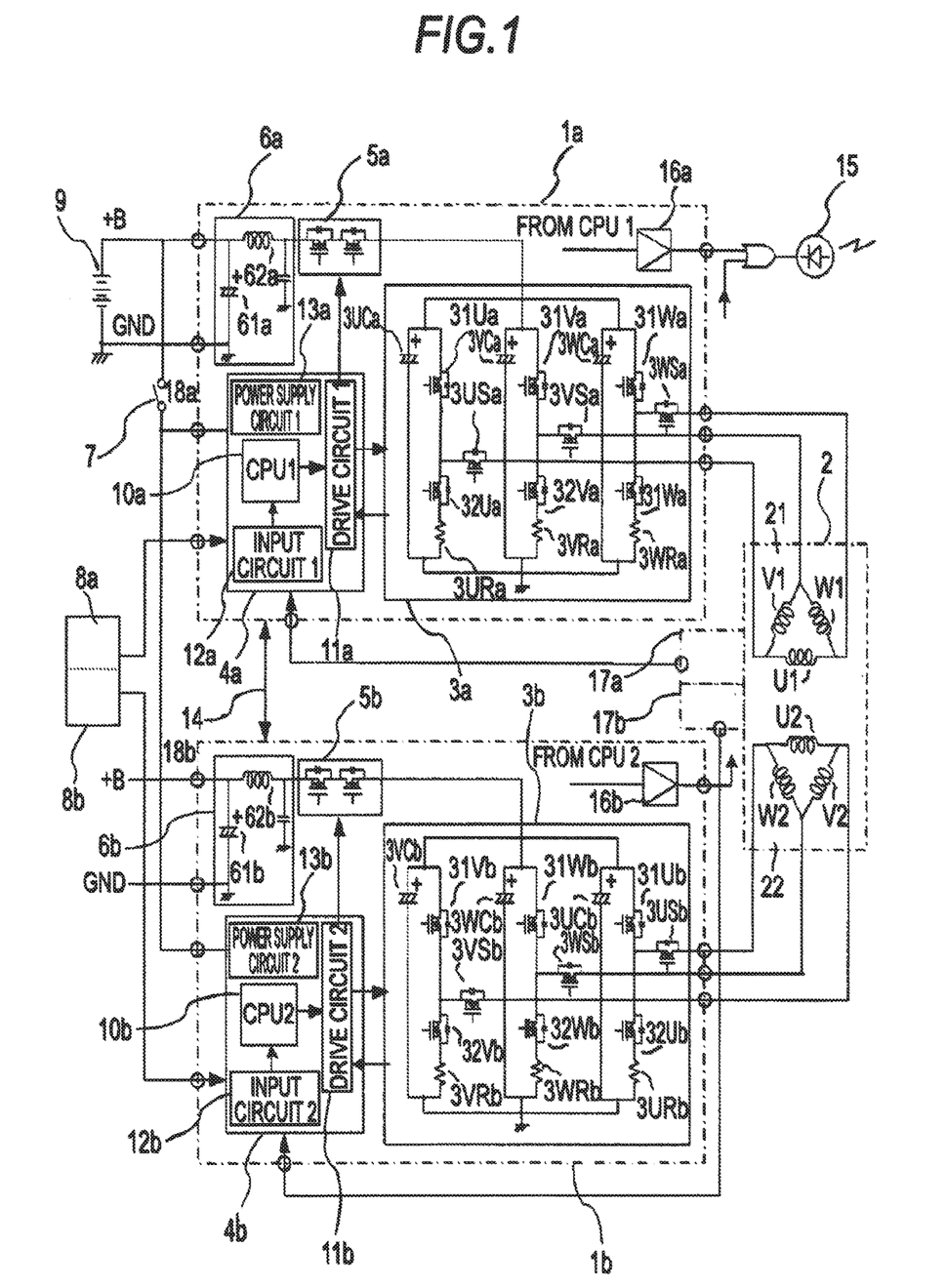
FIG. 1 is a circuit diagram of an electric power steering apparatus according to a first embodiment of the invention.

Hereafter, based on the drawings, an electric power steering apparatus according to a first embodiment of the invention will be described in detail. FIG. 1 is a circuit diagram of the electric power steering apparatus according to the first embodiment of the invention, and includes a double redundant control system formed of a first control system and a second control system. In the following description, "first" is appended to a constituent member belonging to the first control system, and "second" is appended to a constituent member belonging to the second control system.

In FIG. 1, an electric motor 2 that generates an assist torque commensurate with a steering torque applied by a driver is configured of a 3-phase brushless motor including in a stator two sets of 3-phase armature windings formed of a first armature winding 21 and a second armature winding 22. The first armature winding 21 is configured of a delta-connected first U-phase winding U1, first V-phase winding V1, and first W-phase winding W1. The second armature winding 22 is configured of a delta-connected second U-phase winding U2, second V-phase winding V2, and second W-phase winding W2. The first armature winding 21 and the second armature winding 22 are disposed in the stator so as to have a phase difference of an electrical angle of 30 degrees from each other.

A first control unit 1a as a first controller, which controls power supplied to the first armature winding 21, and a second control unit 1b as a second controller, which controls power supplied to the second armature winding 22, are provided as control units that control the electric motor 2. The first control unit 1a and the second control unit 1b are each connected via an ignition switch 7 to a positive electrode side terminal +B of a battery 9 that acts as an external power supply mounted in a vehicle, and are connected to a negative electrode side terminal GND of the battery 9.

The first control unit 1a includes a first inverter circuit 3a that supplies power to the first armature winding 21 of the electric motor 2, a first power supply relay switching element 5a that acts as a relay that connects and disconnects the positive electrode side terminal +B of the battery 9 and the first inverter circuit 3a, a first control circuit unit 4a that controls each semiconductor switching element, to be described hereafter, of the first inverter circuit 3a and the first power supply relay switching element 5a, and a first filter 6a.

The first power supply relay switching element 5a is configured by, for example, two FETs including parasitic diodes being connected in series, wherein the parasitic diode in one FET is connected in a forward direction with respect to a current supply direction, and the parasitic diode in the other FET is connected in a reverse direction with respect to the current supply direction. Consequently, even when the battery 9 is connected with reverse polarity, a line along which current to the first inverter circuit 3a flows is disconnected by a parasitic diode of the first power supply relay switching element 5a, whereby the first inverter circuit 3a can be protected. As a large current flows into the first power supply relay switching element 5a, there is an accompanying generation of heat, so the first power supply relay switching element 5a may be incorporated in the first inverter circuit 3a.

The first inverter circuit 3a includes a first U-phase arm, formed of a serially connected body of a first U-phase upper arm switching element 31Ua and a first U-phase lower arm switching element 32Ua, a first V-phase arm, formed of a serially connected body of a first V-phase upper arm switching element 31Va and a first V-phase lower arm switching element 32Va, and a first W-phase arm, formed of a serially connected body of a first W-phase upper arm switching element 31Wa and a first W-phase lower arm switching element 32Wa. The switching elements of each arm are configured of, for example, MOSFETs having parasitic diodes.

Also, the first inverter circuit 3a includes a first U-phase noise suppressing capacitor 3UCa connected in parallel with the first U-phase arm, a first V-phase noise suppressing capacitor 3VCa connected in parallel with the first V-phase arm, and a first W-phase noise suppressing capacitor 3WCa connected in parallel with the first W-phase arm.

Also, the first inverter circuit 3a includes a first U-phase current detecting shunt resistor 3URa connected in series with the first U-phase lower arm switching element 32Ua, a first V-phase current detecting shunt resistor 3VRa connected in series with the first V-phase lower arm switching element 32Va, and a first W-phase current detecting shunt resistor 3WRa connected in series with the first W-phase lower arm switching element 32Wa.

Furthermore, the first inverter circuit 3a includes a first U-phase motor relay switching element 3USa connected between a series connection point of the first U-phase upper arm switching element 31Ua and first U-phase lower arm switching element 32Ua and the first U-phase winding U1, a first V-phase motor relay switching element 3VSa connected between a series connection point of the first V-phase upper arm switching element 31Va and first V-phase lower arm switching element 32Va and the first V-phase winding V1, and a first W-phase motor relay switching element 3WSa connected between a series connection point of the first W-phase upper arm switching element 31Wa and first W-phase lower arm switching element 32Wa and the first W-phase winding W1. These motor relay switching elements are configured of, for example, FETs having parasitic diodes.

The first control circuit unit 4a includes a first CPU 10a, a first drive circuit 11a, a first input circuit 12a, and a first power supply circuit 13a. The first drive circuit 11a generates a first drive signal based on a first control command from the first CPU 10a, to be described hereafter, and transmits the first drive signal to a control electrode of each of the switching elements 31Ua, 31Va, 31Wa, 32Ua, 32Va, and 32Wa of the first inverter circuit 3a, thereby controlling a turning on and off of the switching elements. As only a small current flows through the first drive circuit 11a, the first drive circuit 11a is mounted in the first control circuit unit 4a, but the first drive circuit 11a may also be disposed in the first inverter circuit 3a.

Also, the first drive circuit 11a is configured so as to output a drive signal that turns on and off the first U-phase motor relay switching element 3USa, the first V-phase motor relay switching element 3VSa, and the first W-phase motor relay switching element 3WSa based on a command from the first CPU 10a, and the first U-phase winding U1, the first V-phase winding V1, and the first W-phase winding W1 are disconnected from the first inverter circuit 3a by the switching elements being turned off.

Furthermore, the first drive circuit 11a is configured so as to also output a drive signal of the first power supply relay switching element 5a based on a command from the first CPU 10a, and a supply of power to the first inverter circuit 3a can be interrupted by the first power supply relay switching element 5a being turned off.

As only a small current flows through the first drive circuit 11a, the first drive circuit 11a is mounted in the first control circuit unit 4a, but the first drive circuit 11a may also be disposed in the first inverter circuit 3a.

A first rotor position detection signal from a first rotation sensor 17a that detects a rotational position of a rotor (not shown) of the electric motor 2, and various kinds of detection signal from first sensors 8a, such as a torque sensor mounted in a vicinity of a steering wheel that detects a steering torque and a speed sensor that detects a traveling speed of a vehicle, are input into the first input circuit 12a, and the first input circuit 12a inputs the input detection signals into the first CPU 10a. The first CPU 10a computes the first control command corresponding to a current value representing a control amount for driving the electric motor 2 from information based on the input detection signals.

Also, signals corresponding to potential differences across each of the first U-phase current detecting shunt resistor 3URa, the first V-phase current detecting shunt resistor 3VRa, and the first W-phase current detecting shunt resistor 3WRa are input via the first input circuit 12a into the first CPU 10a as a first U-phase current detection signal, a first V-phase current detection signal, and a first W-phase current detection signal respectively. Furthermore, signals corresponding to terminal voltages and the like of each of the first U-phase winding U1, the first V-phase winding V1, and the first W-phase winding W1 are input via the first input circuit 12a into the first CPU 10a as a first U-phase winding terminal voltage detection signal, a first V-phase winding terminal voltage detection signal, and a first W-phase winding terminal voltage detection signal respectively.

The first CPU 10a computes a deviation between a detection value based on the input detection signals and the first control command obtained using the previously mentioned computation, and transmits the first control command to the first drive circuit 11a so as to eliminate the deviation. As a result of this, a first armature current supplied to the first armature winding 21 is controlled to a desired value by being subjected to a so-called feedback control.

The first CPU 10a has an abnormality detecting function of detecting an abnormality of the first drive circuit 11a, the first inverter circuit 3a, the first armature winding 21, and the like, in addition to the first sensors 8a, based on the previously mentioned input items of information, and when detecting one of these abnormalities, can transmit a command to the first drive circuit 11a to turn off, for example, the first U-phase upper arm switching element 31Ua and the first U-phase motor relay switching element 3USa in order to interrupt the current supply of the U-phase only in accordance with the abnormality. Alternatively, when the previously mentioned abnormality is detected, the first CPU 10a can transmit a command to the first drive circuit 11a to turn off the first power supply relay switching element 5a in order to interrupt the power supply itself at source in accordance with the abnormality.

Furthermore, when the abnormality is detected by the first CPU 10a, the first CPU 10a outputs a signal causing notification means 15 as notification device to operate to the notification means 15 via a first output circuit 16a. Herein, the notification means 15 is configured of, for example, a lamp, and lights up on receiving a signal from the first CPU 10a.

Signals are also input into the first CPU 10a from second sensors 8b, a second rotation sensor 17b, and the like, to be described hereafter, but details thereof will be described hereafter.

The first power supply circuit 13a is connected to the positive electrode side terminal +B of the battery 9 via the ignition switch 7 of the vehicle via a first power supply terminal 18a, indicated by a circle, provided in the first control unit 1a, receives a supply of power from the battery 9, and operates as an internal power supply in the first control unit 1a. The first power supply relay switching element 5a in the first control unit 1a is configured of a serially connected body of two semiconductor switching elements, and receives a drive signal from the first drive circuit 11a in the first control circuit unit 4a, whereby a turning on and off is controlled, as will be described hereafter.

The first filter 6a includes a first filter capacitor 61a and a first filter coil 62a, restricts an emission of noise caused by a PWM drive, to be described hereafter, of the first inverter circuit 3a, and is disposed in a vicinity of the positive electrode side terminal +B and the negative electrode side terminal GND of the battery 9. As a large current flows into the first filter 6a via the first power supply relay switching element 5a, there is an accompanying generation of heat, so the first filter 6a may be incorporated in the first inverter circuit 3a.

The second control unit 1b includes a second inverter circuit 3b that supplies power to the second armature winding 22 of the electric motor 2, a second power supply relay switching element 5b that acts as a relay that connects and disconnects the positive electrode side terminal +B of the battery 9 and the second inverter circuit 3b, a second control circuit unit 4b that controls each semiconductor switching element, to be described hereafter, of the second inverter circuit 3b and the second power supply relay switching element 5b, and a second filter 6b.

The second power supply relay switching element 5b is configured by, for example, two FETs including parasitic diodes being connected in series, wherein the parasitic diode in one FET is connected in a forward direction with respect to the current supply direction, and the parasitic diode in the other FET is connected in a reverse direction with respect to the current supply direction. Consequently, even when the battery 9 is connected with reverse polarity, a line along which current to the second inverter circuit 3b flows is disconnected by a parasitic diode of the second power supply relay switching element 5b, whereby the second inverter circuit 3b can be protected. As a large current flows into the second power supply relay switching element 5b, there is an accompanying generation of heat, so the second power supply relay switching element 5b may be incorporated in the second inverter circuit 3b.

The second inverter circuit 3b includes a second U-phase arm, formed of a serially connected body of a second U-phase upper arm switching element 31Ub and a second U-phase lower arm switching element 32Ub, a second V-phase arm, formed of a serially connected body of a second V-phase upper arm switching element 31Vb and a second V-phase lower arm switching element 32Vb, and a second W-phase arm, formed of a serially connected body of a second W-phase upper arm switching element 31Wb and a second W-phase lower arm switching element 32Wb. The switching elements of each arm are configured of, for example, MOSFETs having parasitic diodes.

Also, the second inverter circuit 3b includes a second U-phase noise suppressing capacitor 3UCb connected in parallel with the second U-phase arm, a second V-phase noise suppressing capacitor 3VCb connected in parallel with the second V-phase arm, and a second W-phase noise suppressing capacitor 3WCb connected in parallel with the second W-phase arm.

Also, the second inverter circuit 3b includes a second U-phase current detecting shunt resistor 3URb connected in series with the second U-phase lower arm switching element 32Ub, a second V-phase current detecting shunt resistor 3VRb connected in series with the second V-phase lower arm switching element 32Vb, and a second W-phase current detecting shunt resistor 3WRb connected in series with the second W-phase lower arm switching element 32Wb.

Furthermore, the second inverter circuit 3b includes a second U-phase motor relay switching element 3USb connected between a series connection point of the second U-phase upper arm switching element 31Ub and second U-phase lower arm switching element 32Ub and the second U-phase winding U2, a second V-phase motor relay switching element 3VSb connected between a series connection point of the second V-phase upper arm switching element 31Vb and second V-phase lower arm switching element 32Vb and the second V-phase winding V2, and a second W-phase motor relay switching element 3WSb connected between a series connection point of the second W-phase upper arm switching element 31Wb and second W-phase lower arm switching element 32Wb and the second W-phase winding W2. These motor relay switching elements are configured of, for example, FETs having parasitic diodes.

The second control circuit unit 4b includes a second CPU 10b, a second drive circuit 11b, a second input circuit 12b, and a second power supply circuit 13b. The second drive circuit 11b generates a second drive signal based on a second control command from the second CPU 10b, to be described hereafter, and transmits the second drive signal to a control electrode of each of the switching elements 31Ub, 31Vb, 31Wb, 32Ub, 32Vb, and 32Wb of the second inverter circuit 3b, thereby controlling a turning on and off of the switching elements. As only a small current flows through the second drive circuit 11b, the second drive circuit 11b is mounted in the second control circuit unit 4b, but the second drive circuit 11b may also be disposed in the second inverter circuit 3b.

Also, the second drive circuit 11b is configured so as to output a drive signal that turns on and off the second U-phase motor relay switching element 3USb, the second V-phase motor relay switching element 3VSb, and the second W-phase motor relay switching element 3WSb based on a command from the second CPU 10b, and the second U-phase winding U2, the second V-phase winding V2, and the second W-phase winding W2 are disconnected from the second inverter circuit 3b by the switching elements being turned off.

Furthermore, the second drive circuit 11b is configured so as to also output a drive signal of the second power supply relay switching element 5b based on a command from the second CPU 10b, and a supply of power to the second inverter circuit 3b can be interrupted by the second power supply relay switching element 5b being turned off.

As only a small current flows through the second drive circuit 11b, the second drive circuit 11b is mounted in the second control circuit unit 4b, but the second drive circuit 11b may also be disposed the second inverter circuit 3b.

A second rotor position detection signal from the second rotation sensor 17b, which detects a rotational position of a rotor (not shown) of the electric motor 2, and various kinds of detection signal from the second sensors 8b, such as a torque sensor mounted in a vicinity of the steering wheel that detects a steering torque and a speed sensor that detects a traveling speed of the vehicle, are input into the second input circuit 12b, and the second input circuit 12b inputs the input detection signals into the second CPU 10b. The second CPU 10b computes the second control command corresponding to a current value representing a control amount for driving the electric motor 2 from information based on the input detection signals.

The second rotation sensor 17b and the first rotation sensor 17a are of the same configuration, and are disposed in parallel in a vicinity of the rotor of the electric motor 2. Also, the second sensors 8b and the first sensors 8a are of the same configuration, and are disposed in parallel in predetermined regions of the vehicle.

Also, signals corresponding to potential differences across each of the second U-phase current detecting shunt resistor 3URb, the second V-phase current detecting shunt resistor 3VRb, and the second W-phase current detecting shunt resistor 3WRb are input via the second input circuit 12b into the second CPU 10b as a second U-phase current detection signal, a second V-phase current detection signal, and a second W-phase current detection signal respectively. Furthermore, signals corresponding to terminal voltages and the like of each of the second U-phase winding U2, the second V-phase winding V2, and the second W-phase winding W2 are input via the second input circuit 12b into the second CPU 10b as a second U-phase winding terminal voltage detection signal, a second V-phase winding terminal voltage detection signal, and a second W-phase winding terminal voltage detection signal respectively.

The second CPU 10b computes a deviation between a detection value based on the input detection signals and the second control command obtained using the previously mentioned computation, and transmits the second control command, which changes the deviation to "0", to the second drive circuit 11b. As a result of this, a second armature current supplied to the second armature winding 22 is controlled to a desired value by being subjected to a so-called feedback control.

The second CPU 10b has an abnormality detecting function of detecting an abnormality of the second drive circuit 11b, the second inverter circuit 3b, the second armature winding 22, and the like, in addition to the second sensors 8b, based on the previously mentioned input items of information, and when detecting one of these abnormalities, can transmit a command to the second drive circuit 11b to turn off, for example, the second U-phase upper arm switching element 31Ub and the second U-phase motor relay switching element 3USb in order to interrupt the current supply of the U-phase only in accordance with the abnormality. Alternatively, when the previously mentioned abnormality is detected, the second CPU 10b can transmit a command to the second drive circuit 11b to turn off the second power supply relay switching element 5b in order to interrupt the power supply itself at source in accordance with the abnormality.

Furthermore, when the abnormality is detected by the second CPU 10b, the second CPU 10b outputs a signal causing the notification means 15 to operate to the notification means 15 via a second output circuit 16b. Herein, the notification means 15 is configured of, for example, a lamp, and lights up on receiving a signal from the second CPU 10b, as previously described.

Signals are also input into the second CPU 10b from the first sensors 8a, the first rotation sensor 17a, and the like, but details thereof will be described hereafter.

The second power supply circuit 13b is connected to the positive electrode side terminal +B, of the battery 9 via the ignition switch 7 of the vehicle via a second power supply terminal 18b, indicated by a circle, provided in the second control unit 1b, receives a supply of power from the battery 9, and operates as an internal power supply in the second control unit 1b. The second power supply relay switching element 5b in the second control unit 1b is configured of a serially connected body of two semiconductor switching elements, and receives a drive signal from the second drive circuit 11b in the second control circuit unit 4b, whereby a turning on and off is controlled, as will be described hereafter.

The second filter 6b includes a second filter capacitor 61b and a second filter coil 62b, restricts an emission of noise caused by a PWM drive, to be described hereafter, of the second inverter circuit 3b, and disposed in a vicinity of the positive electrode side terminal +B and the negative electrode side terminal GND of the battery 9. As a large current flows into the second filter 6b via the second power supply relay switching element 5b, there is an accompanying generation of heat, so the second filter 6b may be incorporated in the second inverter circuit 3b.

The electric motor 2 is configured of a brushless motor wherein each of the two sets of 3-phase armature windings 21 and 22 is delta-connected, as previously described. Consequently, the first rotation sensor 17a and the second rotation sensor 17b for detecting a rotor rotational position are mounted, as previously described. In this way, each of two sets of rotation sensor, those being the first rotation sensor 17a and the second rotation sensor 17b, is mounted in order to maintain a redundant control system for a rotation sensor too. Rotor rotation information detected by the first rotation sensor 17a and the second rotation sensor 17b is transmitted to the first input circuit 12a of the first control circuit unit 4a and the second input circuit 12b of the second control circuit unit 4b respectively.

The electric motor 2 may be a 3-phase delta connected brushless motor or a 3-phase star connected brushless motor, and furthermore, the electric motor 2 may be a brushed motor with two pairs of poles. Also, with regard to armature winding specifications, either a distributed winding or a concentrated winding can be employed. Furthermore, the electric motor 2 may be a so-called tandem motor having two stators. Also, rather than a configuration such that two sets of armature windings are caused to operate in concert, a configuration may be such that a deed motor rotation speed and torque can be output using only one set of armature windings.

The electric power steering apparatus according to the first embodiment of the invention is such that at least the first control unit 1a, the first rotation sensor 17a, and the first armature winding 21 configure the first control system, and at least the second control unit 1b, the second rotation sensor 17b, and the second armature winding 22 configure the second control system. The first control system and the second control system are configured so that a supply of current can be carried out to each of the first armature winding 21 and the second armature winding 22 independently.

Circles other than the first power supply terminal 18a and the second power supply terminal 18b in FIG. 1 indicate connection terminals provided in each of the first control unit 1a and the second control unit 1b.

As heretofore described, the first control unit 1a and the second control unit 1b are configured so as to be capable of independently driving the electric motor 2 by independently using input information and a computed control amount value. Also, a communication line 14 is connected between the first control unit 1a and the second control unit 1b in order that various kinds of data and information can be exchanged. The communication line 14 connects the first CPU 10a and the second CPU 10b, whereby the CPU of one control system can ascertain a condition of the other control system.

For example, when the first CPU 10a detects an abnormality in some member of the first control system, and for that reason turns off a predetermined switching element, details of the abnormality detection, the member in which the abnormality has occurred, a drive condition of the electric motor, and the like, can be transmitted to the second CPU 10b. When an abnormality occurs in one CPU itself, a regular communication signal in accordance with a predetermined format can no longer be exchanged with the other CPU, because of which the other CPU can detect the occurrence of the abnormality in the one CPU itself.

Figure 2:
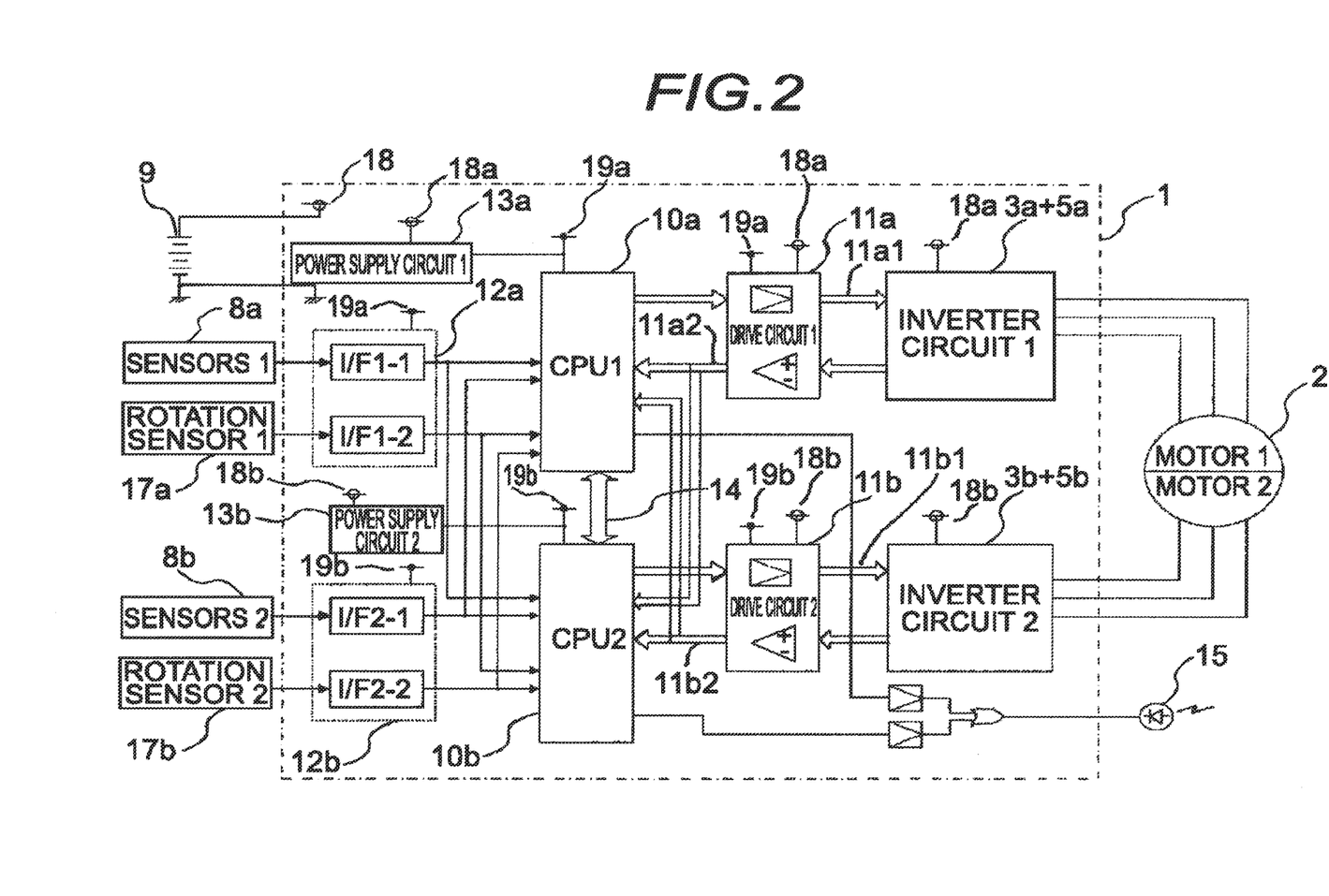
FIG. 2 is a configuration diagram of the electric power steering apparatus according to the first embodiment of the invention.

Next, the control unit configuration and the CPU functions will be described in greater detail. FIG. 2 is a configuration diagram of the electric power steering apparatus according to the first embodiment of the invention, shows the first control unit 1a and the second control unit 1b encompassed as a control unit 1, and shows a mutual connection state between all circuits configuring the first control unit 1a and the second control unit 1b.

The control unit 1 is such that power is supplied from the battery 9 acting as an external power supply, and detection signals are input from each of the first sensors 8a and the second sensors 8b, and from the first rotation sensor 17a and the second rotation sensor 17b mounted in a vicinity of the rotor of the electric motor 2. More specifically, the first input circuit 12a includes an interface circuit I/F 1-1 and an interface circuit I/F 1-2, the first sensors 8a are connected via the interface circuit I/F 1-1 to the first CPU 10a and the second CPU 10b, and the first rotation sensor 17a is connected via the interface circuit I/F 1-2 to the first CPU 10a and the second CPU 10b.

Also, the second input circuit 12b includes an interface circuit I/F 2-1 and an interface circuit I/F 2-2, the second sensors 8b are connected via the interface circuit I/F 2-1 to the second CPU 10b and the first CPU 10a, and the second rotation sensor 17b is connected via the interface circuit I/F 2-2 to the second CPU 10b and the first CPU 10a.

According to the heretofore described configuration, the first CPU 10a and the second CPU 10b can acquire not only sensor information of their own control system in the redundant control system, but also sensor information of the other control system.

The first power supply circuit 13a, as previously described, is connected to the positive electrode side terminal +B of the battery 9 by the first power supply terminal 18a via the ignition switch 7, and is configured so as to receive, for example, 12V DC from the battery 9, and output a constant voltage of, for example, 5V DC as a first constant voltage source 19a. The second power supply circuit 13b, as previously described, is connected to the positive electrode side terminal +B of the battery 9 by the second power supply terminal 18b via the ignition switch 7, and is configured so as to receive, for example, 12V DC from the battery 9, and output a constant voltage of, for example, 5V DC as a second constant voltage source 19b.

The first constant voltage source 19a and the second constant voltage source 19b are each independent power supply systems, and are not configurations that supply power to a circuit of the other control system configuring the redundant control system. Consequently, the first power supply circuit 13a does not supply power to the second CPU 10b, and the second power supply circuit 13b does not supply power to the first CPU 10a.

The first drive circuit 11a, on receiving a control command from the first CPU 10a, independently controls the first inverter circuit 3a and the first power supply relay switching element 5a. In the same way, the second drive circuit 11b, on receiving a control command from the second CPU 10b, independently controls the second inverter circuit 3b and the second power supply relay switching element 5b.

In FIG. 2, the first power supply relay switching element 5a is shown as being included in the first inverter circuit 3a, and the second power supply relay switching element 5b is shown as being included in the second inverter circuit 3b. Also, one portion of circuits that detect voltage across each of the first U-phase current detecting shunt resistor 3URa, the first V-phase current detecting shunt resistor 3VRa, and the first W-phase current detecting shunt resistor 3WRa, terminal voltage of the first armature winding 21 of the electric motor 2, and the like, is also incorporated in the first inverter circuit 3a. One portion of circuits that detect voltage across each of the second U-phase current detecting shunt resistor 3URb, the second V-phase current detecting shunt resistor 3VRb, and the second W-phase current detecting shunt resistor 3WRb, terminal voltage of the second armature winding 22 of the electric motor 2, and the like, is also incorporated in the second inverter circuit 3b.

Also, in FIG. 2, the other portion of the circuits that detect voltage across each of the first U-phase current detecting shunt resistor 3URa, the first V-phase current detecting shunt resistor 3VRa, and the first W-phase current detecting shunt resistor 3WRa, the terminal voltage of the first armature winding 21 of the electric motor 2, and the like, is incorporated in the first drive circuit 11a. Furthermore, the other portion of the circuits that detect voltage across each of the second U-phase current detecting shunt resistor 3URb, the second V-phase current detecting shunt resistor 3VRb, and the second W-phase current detecting shunt resistor 3WRb, the terminal voltage of the second armature winding 22 of the electric motor 2, and the like, is incorporated in the second drive circuit 11b.

The first drive circuit 11a generates an output signal 11a1 that heads to the first inverter circuit 3a and an input signal 11a2 that heads to both the first CPU 10a and the second CPU 10b. The second drive circuit 11b generates an output signal 11b1 that heads to the second inverter circuit 3b and an input signal 11b2 that heads to both the second CPU 10b and the first CPU 10a. In the drawing, a broad white arrow indicates that a multiple of wires and/or a multiple of items of information are incorporated.

Also, the first input circuit 12a and the second input circuit 12b are taken here to be collective terms also including all voltage signals of the first sensors 8a and the second sensors 8b, the first rotation sensor 17a and the second rotation sensor 17b, and the first inverter circuit 3a and the second inverter circuit 3b. Because of this, in FIG. 2, the first input circuit 12a and the second input circuit 12b are connected so that an input signal from the inverter circuit of one control system is also transmitted not only to the CPU of that control system but also the CPU of the other control system, and furthermore, input information from the input circuit of one control system is input not only into the CPU of that control system but also the CPU of the other control system. Also, the CPU of one control system and the CPU of the other control system are connected so as to transmit information to each other using the communication line 14.

Next, the functions of the first CPU 10a and the second CPU 10b in the control unit 1 configured as heretofore described will be described in greater detail. The first CPU 10a and the second CPU 10b are configured of exactly the same kind of CPU, and practically identical software is incorporated.

Input information from the first sensors 8a and the first rotation sensor 17a, and input information from the first inverter circuit 3a and the like, is input into the first CPU 10a via the first input circuit 12a, and the first CPU 10a, based on these items of input information, computes a control amount for supplying current to the first armature winding 21 of the electric motor 2 in order to assist steering torque applied by the driver, outputs a result of the computation as the first control command, and transmits the first control command to the first drive circuit 11a.

Also, the first CPU 10a has an abnormality detecting function of detecting an abnormality in the control system of the first CPU 10a itself by monitoring each item of input information. That is, the first CPU 10a detects an abnormality of the first sensors 8a or first rotation sensor 17a when a detected value of the first sensors 8a or first rotation sensor 17a is a value outside a predetermined range, or when the detected value changes sharply. Also, the first CPU 10a acquires information on the other control system, because of which, when the detected value of the corresponding first sensors 8a or first rotation sensor 17a is fixed despite a detected value of the second sensors 8b or second rotation sensor 17b changing, the first CPU 10a detects a fixed abnormality of the second sensors 8b or second rotation sensor 17b.

Also, the first CPU 10a detects an abnormality of the first inverter circuit 3a when, despite outputting a predetermined control command, a value of voltage across at least one shunt resistor of the first U-phase current detecting shunt resistor 3URa, first V-phase current detecting shunt resistor 3VRa, or first W-phase current detecting shunt resistor 3WRa is a value outside a predetermined range, that is, when a desired current is not flowing or when a large current is flowing.

Furthermore, the first CPU 10a detects an abnormality of the first armature winding 21 when a predetermined terminal voltage corresponding to a drive state of the upper arm switching elements 31Ua, 31Va, and 31Wa of each phase, and lower arm switching elements 32Ua, 32Va, and 32Wa of each phase, in the first inverter circuit 3a is not being emitted from a terminal of at least one phase winding of the first armature winding 21.

Also, the first CPU 10a can also check an existence or otherwise of a turning on or turning off operation of each of the switching elements of the first inverter circuit 3a from a voltage across the switching elements. As heretofore described, the first CPU 10a can individually determine abnormalities of each circuit and the like of the control system to which the CPU 10a itself belongs, and store the abnormality.

Input information from the second sensors 8b and the second rotation sensor 17b, and input information from the second inverter circuit 3b and the like, is input into the second CPU 10b via the second input circuit 12b, and the second CPU 10b, based on these items of input information, computes a control amount for supplying current to the second armature winding 22 of the electric motor 2 in order to assist steering torque applied by the driver, outputs a result of the computation as the second control command, and transmits the second control command to the second drive circuit 11b.

Also, the second CPU 10b has an abnormality detecting function of detecting an abnormality in the control system to which the second CPU 10b itself belongs by monitoring each item of input information. That is, the second CPU 10b detects an abnormality of the second sensors 8b or second rotation sensor 17b when a detected value of the second sensors 8b or second rotation sensor 17b is a value outside a predetermined range, or when the detected value changes sharply. Also, the second CPU 10b acquires information on the other control system, because of which, when the detected value of the corresponding second sensors 8b or second rotation sensor 17b is fixed despite a detected value of the first sensors 8a or first rotation sensor 17a changing, the second CPU 10b detects a fixed abnormality of the first sensors 8a or first rotation sensor 17a.

Also, the second CPU 10b detects an abnormality of the second inverter circuit 3b when, despite outputting a predetermined control command, a value of voltage across at least one shunt resistor of the second U-phase current detecting shunt resistor 3URb, second V-phase current detecting shunt resistor 3VRb, or second W-phase current detecting shunt resistor 3WRb is a value outside a predetermined range, that is, when a desired current is not flowing or when a large current is flowing.

Furthermore, the second CPU 10b can determine an abnormality of the second armature winding 22 when a predetermined terminal voltage corresponding to a drive state of the upper arm switching elements 31Ub, 31Vb, and 31Wb of each phase, and the lower arm switching elements 32Ub, 32Vb, and 32Wb of each phase, in the second inverter circuit 3b is not being emitted from a terminal of at least one phase winding of the second armature winding 22.

Also, the second CPU 10b can also check an existence or otherwise of a turning on or turning off operation of each of the switching elements of the second inverter circuit 3b from a voltage across the switching elements. As heretofore described, the second CPU 10*b* can individually determine abnormalities of each circuit and the like of the control system to which the CPU 10*b* itself belongs, and store the abnormality.

Furthermore, as a circuit network is formed as shown in FIG. 2, the first CPU 10*a* and the second CPU 10*b* acquire not only input information of the control system to which the CPU itself belongs, but also input information of the control system of the other CPU, and can ascertain an abnormality not only of the control system to which the CPU itself belongs, but also of the control system of the other CPU. Also, as the first CPU 10*a* and the second CPU 10*b* are connected to each other by the communication line 14, details of a detected abnormality in the CPU itself can also be transmitted to the other CPU.

Also, the first CPU 10*a* and the second CPU 10*b* can transmit not only an input system-related abnormality of the control system to which the CPU belongs, but also details of a control amount and/or control command as output information computed from input information, to the CPU of the other control system, because of which the CPU can compare details of a control amount and/or control command of the control system to which the CPU itself belongs, computed by the CPU itself, and details of a control amount and/or control command computed by the CPU of the other control system, and ascertain an abnormality such that output information differs despite the input information of the two being practically identical. As a result of this, the first CPU 10*a* and the second CPU 10*b* can detect various abnormalities, and details thereof, of the control system to which the CPU itself belongs and the control system to which the other CPU belongs. Also, by the communication line 14 being provided, the CPU can also detect that an abnormality has occurred in the CPU of the other control system itself when communication from the CPU of the other control system is interrupted.

Each of the first CPU 10*a* and the second CPU 10*b* independently outputs a control command based on input information at a normal time, and supplies current to the corresponding first armature winding 21 and the second armature winding 22 of the electric motor 2. Note that there is also a case in which the control commands of the first CPU 10*a* and the second CPU 10*b* are output in concert with each other in order that an output shaft of the electric motor 2 can output a desired rotation speed and torque, but in this case too, there is basically independent control. For example, depending on the electric motor armature winding structure, it may happen that the electric motor 2 does not rotate smoothly unless a predetermined phase difference is provided between output to the first armature winding 21 and output to the second armature winding 22 from the control unit 1, but even this kind of case can be responded to by carrying out drive control such that each CPU computes an independent control amount, and synchronization is carried out in, for example, both CPUs so that a desired phase difference is obtained at a point at which output is actually carried out, or the like.

When the first CPU 10*a* or the second CPU 10*b* detects an abnormality, particularly an input system-related abnormality, in the control system to which the CPU itself belongs, the control system on the side on which the abnormality occurs has not been able to continue the drive of the electric motor to date because each control system is independently controlled. However, according to the electric power steering apparatus according to the first embodiment of the invention, as shown in FIG. 2, the configuration is such that input information of one control system is input into the CPU of the other control system, because of which, when there is an abnormality in one control system, the CPU can operate so as to continue the drive of the electric motor 2 by utilizing the input information of the other control system. Also, the CPU of the one control system on the normal side can also, for example, correct the control amount of the CPU itself by recognizing that the CPU of the other control system is operating in response to an abnormality in the other control system.

Also, the CPU of each control system can also ascertain a power supply circuit abnormality in the control system to which the CPU itself belongs by monitoring the 5V output voltage value or the 12V input voltage value of the power supply circuit of the other control system as other input system-related abnormality details.

According to the electric power steering apparatus according to the first embodiment of the invention, as heretofore described, the device is configured so that control when there is an input system-related abnormality in one control system is such that the electric motor 2 is driven in the same way as at a normal time, because of which the driver cannot sense the abnormality in any way from a driving state of the vehicle. Therefore, as previously described, the CPU of each control system outputs a light/flash signal to the notification means 15 via the output circuit of the control system to which the CPU itself belongs in order to notify the driver of an abnormality by causing the lamp configuring the notification means 15 to light up or flash.

Next, a description will be given of detecting an output system-related abnormality, and of a way of responding to the abnormality. Herein, output system-related refers to the first drive circuit 11*a* and the second drive circuit 11*b*, the first inverter circuit 3*a* and the second inverter circuit 3*b*, and furthermore, the first armature winding 21 and the second armature winding 22 of the electric motor 2, in FIG. 2.

A wide variety of abnormalities, such as details related to an abnormality in at least one phase winding in at least one armature winding of the two sets of armature windings 21 and 22 of the electric motor 2, details related to one of the power supply relay switching elements 5*a* and 5*b*, details related to an abnormality in one of the drive circuits 11*a* and 11*b*, or details related to a composite of these abnormalities, are conceivable as details of an output system-related abnormality.

Therefore, abnormality levels are classified into an abnormality level 1, an abnormality level 2, and an abnormality level 3 in accordance with an effect of the abnormality, and measures commensurate with the relevant abnormality level are taken when an abnormality occurs. For example, the abnormality level 3 is taken to be an abnormality such that supplying current to the electric motor 2 becomes completely impossible, as in a case of an open circuit fault of the first power supply relay switching element 5*a* or the second power supply relay switching element 5*b*, or a short circuit fault of an upper arm switching element or a lower arm switching element of the first inverter circuit 3*a* or the second inverter circuit 3*b*. At the abnormality level 3, the control system on the side on which the abnormality occurs can take no measure other than to stop the drive of the electric motor 2, and the drive of the electric motor 2 is continued by the control system on the normal side only.

Next, the abnormality level 1 is an abnormality of a level such that although an abnormality is occurring, there is no immediate effect on the drive of the electric motor 2, as in a case of, for example, a short circuit fault of the first power supply relay switching element 5a or the second power supply relay switching element 5b, a short circuit fault of the motor relay switching elements 3USa, 3VSa, and 3WSa of each phase of the first inverter circuit 3a, or a short circuit fault of the motor relay switching elements 3USb, 3VSb, and 3WSb of each phase of the second inverter circuit 3b. At this kind of abnormality level 1, the driver is simply notified of the abnormality via the notification means 15, the drive of the electric motor 2 is continued as normal, in the same way as in a case of an input system abnormality, and the way of responding to the abnormality level 1 is equivalent to the way of responding when there is an input system abnormality.

The abnormality level 2 is an abnormality of a level between the abnormality level 1 and the abnormality level 3, and means an abnormality of a level that does not go as far as stopping the drive of the electric motor 2, but is such that a normal drive cannot be carried out. For example, this is an abnormality of a level of a case of an open circuit fault of only one of the upper arm switching elements or the lower arm switching elements of the first inverter circuit 3a or the second inverter circuit 3b, or an open circuit fault of only one of the motor relay switching elements 3USa, 3VSa, and 3WSa of each phase of the first inverter circuit 3a or the motor relay switching elements 3USb, 3VSb, and 3WSb of each phase of the second inverter circuit 3b.

In the case of the abnormality level 2, a 2-phase drive can be carried out using at least two normal phases of the armature winding in the control system in which the abnormality occurs. Because of this, 2-phase drive using two normal phases is carried out in the control system in which the abnormality has occurred, and meanwhile, 3-phase drive is continued as normal in the normal control system, because of which, although steering power assist is not 100%, steering power assist a half or more of that at a normal time can be achieved. Furthermore, the CPU of the normal control system is notified via the communication line 14 that the control system in which the abnormality has occurred is carrying out 2-phase drive, because of which, provided that the normal control system has leeway, supplementing can be carried out using the output of the normal control system to as to compensate for the abnormal one phase of the control system in which the abnormality has occurred. This supplementing can be carried out by increasing the overall control amount of the normal control system, or by increasing the control amount of the phase of the control system on the normal side corresponding to the one phase of the control system in which the abnormality has occurred.

Also, regarding output to the notification means 15 when an abnormality is detected, the configuration is such that, for example, the lamp acting as the notification means 15 can be turned on, even when this is based on an output from the CPU of one of the control systems, as shown in FIG. 1 and FIG. 2. That is, when detection of an abnormality occurring is other than in a CPU, that is, when the CPU itself is operating normally in both control systems, a control signal that can cause the lamp acting as the notification means 15 to light up or flash is output from the CPU of the control system in which the abnormality is detected. In this case, the lighting mode can also be changed in accordance with the abnormality details. Also, the configuration is such that the notification means 15 can be driven by the CPUs of both control systems, because of which, when an abnormality extends as far as the CPU itself of one control system, the notification means 15 can be driven by the CPU of the control system on the normal side in place of the CPU of the control system in which the abnormality has occurred.

According to the electric power steering apparatus according to the first embodiment of the invention, as heretofore described, a CPU transmits input system-related information of a control system of the CPU itself to a CPU of another control system, and when an input system-related abnormality in the control system of the CPU itself is detected, the CPU continues a drive of an electric motor by utilizing the input information of the other control system, whereby a vehicle can continue to be driven without stopping the drive of the electric motor and disabling travel of the vehicle, and redundancy of the control system can be improved. Also, regarding an output system-related abnormality of the control system of the CPU itself, the CPU continues the drive of the electric motor as far as possible in the control system of the CPU itself, and the normal control system, by recognizing the details of a response to the abnormality in the control system in which the abnormality has occurred, can compensate for an insufficiency in an operation of the control system in which the abnormality has occurred.

Second Embodiment

Figure 3:
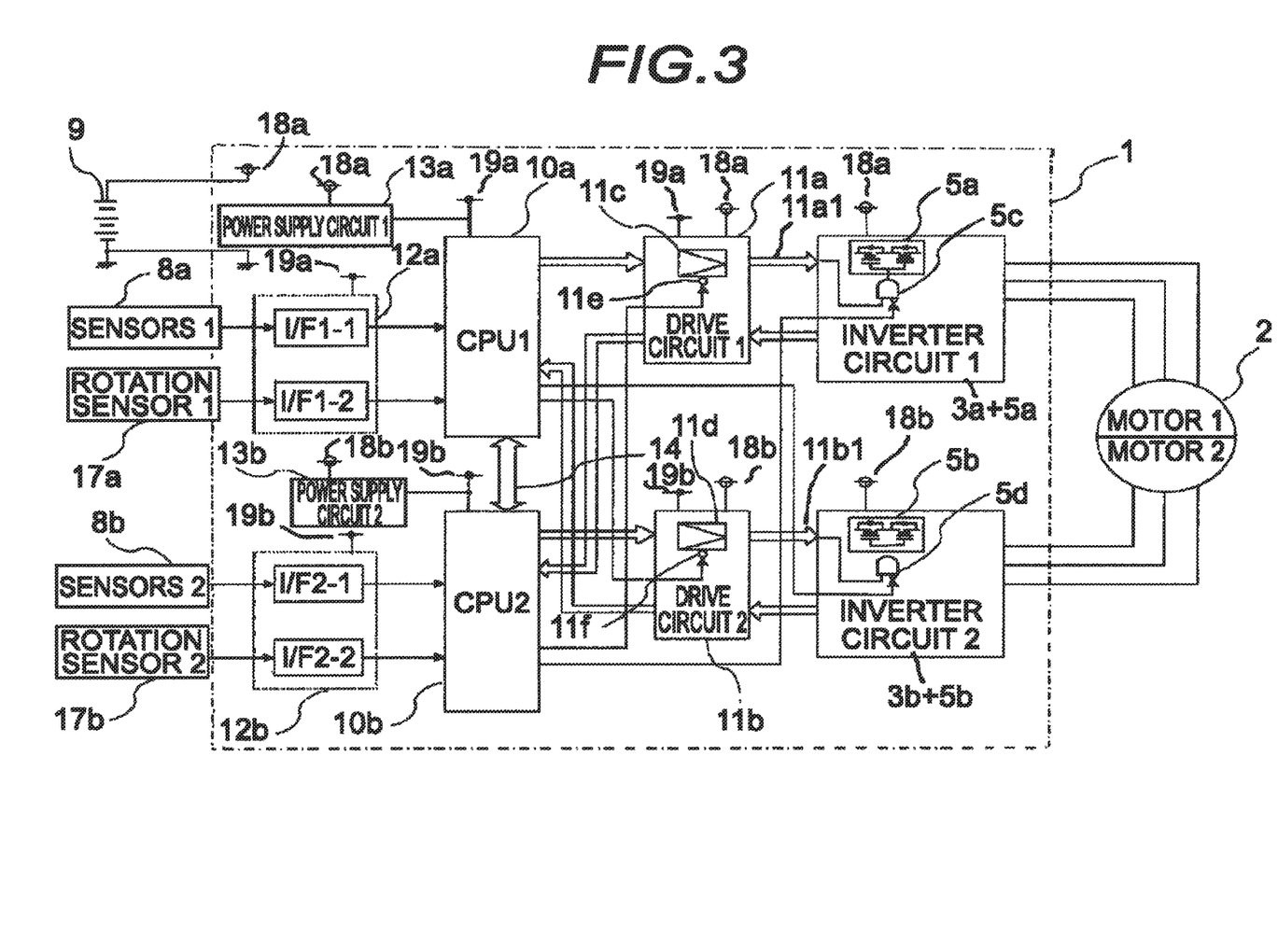
FIG. 3 is a configuration diagram of an electric power steering apparatus according to a second embodiment of the invention.

Next, an electric power steering apparatus according to a second embodiment of the invention will be described. FIG. 3 is a configuration diagram of the electric power steering apparatus according to the second embodiment of the invention. FIG. 3 is a configuration diagram corresponding to FIG. 2 of the first embodiment, wherein reference signs the same as in FIG. 2 indicate the same or equivalent regions. In FIG. 3, input system information from the first input circuit 12a and the second input circuit 12b is independently input into the first CPU 10a and the second CPU 10b respectively.

Input information of the other control system is received by the CPU of one control system via the communication line 14 every predetermined processing cycle, and input information of one control system is transmitted to the CPU of the other control system via the communication line 14 every predetermined processing cycle. Because of this, there is an advantage in that wiring can be reduced in comparison with the case of the first embodiment shown in FIG. 2, and also, data acquired by the CPU of one control system is transferred to the CPU of the other control system, because of which a functional abnormality in a CPU, for example an A/D conversion function, can be verified by comparing the two.

Also, input information output from the first drive circuit 11a belonging to one control system is transferred only to the second CPU 10b belonging to the other control system. Furthermore, input information output from the first inverter circuit 3a belonging to the one control system is transferred only to the second CPU 10b belonging to the other control system via the first drive circuit 11a. In the same way, input information output from the second drive circuit 11b belonging to the other control system is transferred only to the first CPU 10a belonging to the one control system. Furthermore, input information output from the second inverter circuit 3b belonging to the other control system is transferred only to the first CPU 10a belonging to the one control system via the second drive circuit 11b.

In this way, the configuration is such that the output and input of each control system is individually checked in the CPUs of differing control systems. That is, the electric power steering apparatus according to the second embodiment of the invention is of a configuration such that the CPU of each control system monitors and checks the other control system, whereby mutual control system monitoring can be further strengthened. Control amount and control command output values of the other control system can be obtained via the communication line 14.

Also, an inhibitor terminal, which can forcibly stop an output of an initial stage drive circuit provided in the drive circuit of one control system based on a command from the CPU of the other control system, is provided. That is, a first initial stage drive circuit 11c provided in the first drive circuit 11a, which drives each switching element of the first inverter circuit 3a, is configured so that output is forcibly stopped by a signal from a first inhibitor terminal 11e that operates based on a command from the second CPU 10b. For this purpose, the first inhibitor terminal 11e provided in the first drive circuit 11a is connected to an output line of the second. CPU 10b.

In the same way, a second initial stage drive circuit 11d provided in the second drive circuit 11b, which drives each switching element of the second inverter circuit 3b, is configured so that output is forcibly stopped by a signal from a second inhibitor terminal 11f that operates based on a command from the first CPU 10a. For this purpose, the second inhibitor terminal 11f provided in the second drive circuit 11b is connected to an output line of the first CPU 10a.

Furthermore, in the first inverter circuit 3a, a first AND circuit 5c is added to a leading end portion of a control terminal that can turn the first power supply relay switching element 5a on and off, an output line from the first CPU 10a is connected to one input terminal of two input terminals of the first AND circuit 5c, and an output line of the second CPU 10b is connected via an inhibitor terminal to the other input terminal. In the same way, in the second inverter circuit 3b, a second AND circuit 5d is added to a leading end portion of a control terminal that can turn the second power supply relay switching element 5b on and off, an output line from the second CPU 10b is connected to one input terminal of two input terminals of the second AND circuit 5d, and an output line of the first CPU 10a is connected via an inhibitor terminal to the other input terminal.

Other configurations are the same as those of the electric power steering apparatus according to the first embodiment.

According to the electric power steering apparatus according to the second embodiment of the invention configured as heretofore described, a signal line for forcibly stopping output from the CPU of the other control system is connected to an output system-related circuit of one control system, because of which the drive of the electric motor can be stopped by a command from the CPU of the other control system, even when an abnormality such that the CPU of one control system cannot be controlled occurs, when an abnormality like the abnormality level 3 described in the first embodiment occurs, or when falling into a condition such that there is a possibility that the drive of the electric motor cannot be stopped with one CPU. As a result of this, safety of a double system can be further increased.

Also, according to the electric power steering apparatus according to the second embodiment of the invention, the configuration is such that input information of the other control system is received by the CPU of one control system via the communication line 14, and input information of one control system is transmitted to the CPU of the other control system via the communication line 14, because of which the CPU of one control system can recognize extremely easily that an abnormality is occurring in the CPU of the other control system by communication information from the CPU of the other control system via the communication line 14 being interrupted.

Furthermore, an occurrence of an abnormality such as a power supply circuit failure, an abnormality in a CPU clock unit, although not shown, or an abnormal control amount value caused by a computing abnormality of the CPU, is conceivable, and in this kind of case, there is a possibility of a state of, in particular, an output port of the CPU being stuck on the side that turns the drive of the electric motor on, but according to the electric power steering apparatus according to the second embodiment of the invention, an AND circuit is provided on a control terminal that can turn the power supply relay switching element in the inverter circuit of one control system on and off, an output line from the CPU of the control system of the CPU itself is connected to one input terminal of two input terminals of the AND circuit, and an output line of the CPU of the other control system is connected via an inhibitor terminal to the other input terminal, because of which the drive of the electric motor can be forcibly interrupted.

According to the electric power steering apparatus according to the second embodiment of the invention, as heretofore described, wiring can be simplified by input system-related information being exchanged via a communication line between the CPUs of each control system. Also, mutual monitoring of output system-related information can be strengthened by output command results of each control system being mutually checked. Also, the output of one drive circuit or power supply relay switching element can be stopped by the CPU of the other control system, because of which safety is increased.

Third Embodiment

Figure 4:
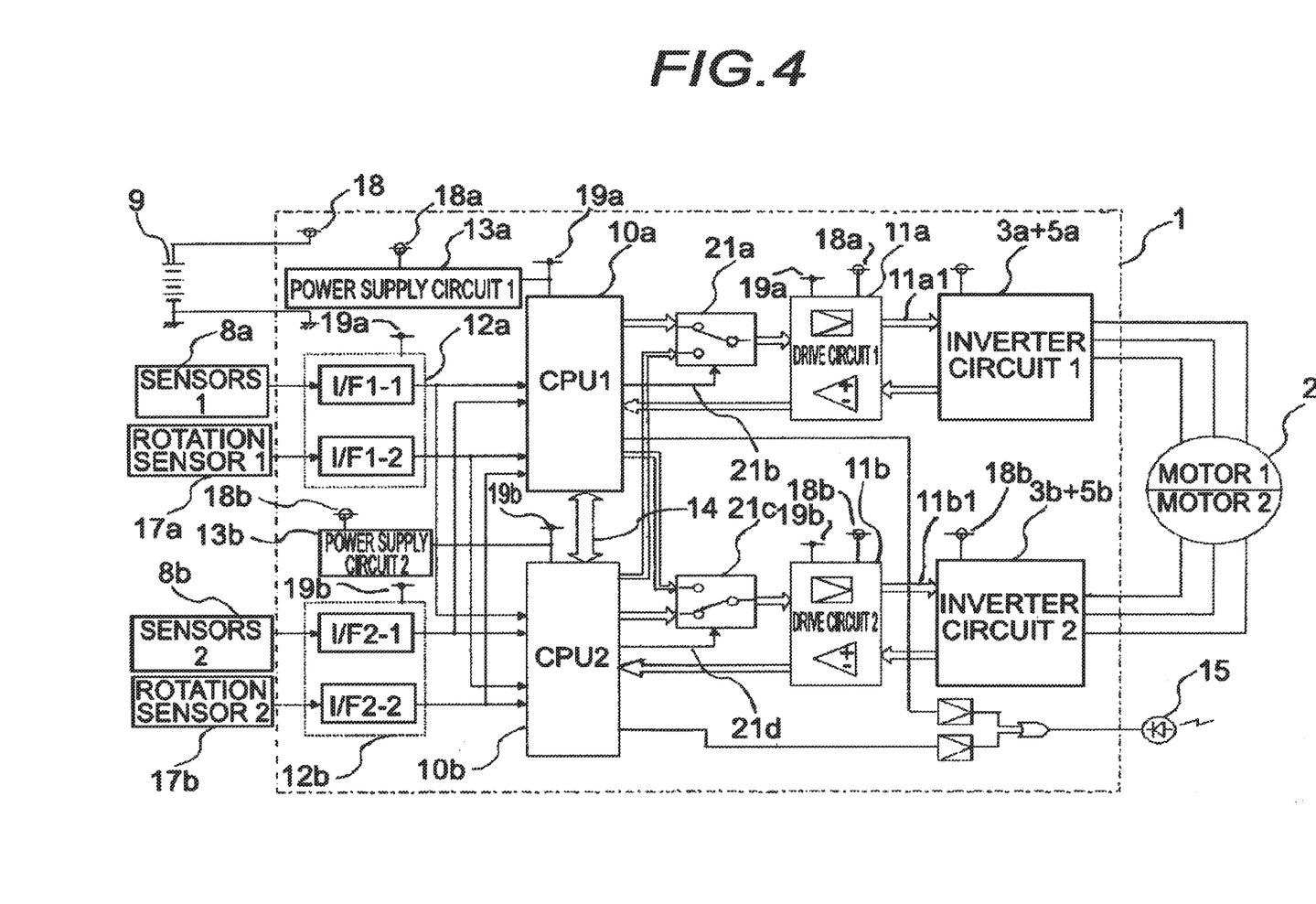
FIG. 4 is a configuration diagram of an electric power steering apparatus according to a third embodiment of the invention.

Next, an electric power steering apparatus according to a third embodiment of the invention will be described. FIG. 4 is a configuration diagram of the electric power steering apparatus according to the third embodiment of the invention. FIG. 4 is a configuration diagram corresponding to FIG. 2 of the first embodiment, wherein reference signs the same as in FIG. 2 indicate the same or equivalent regions.

In FIG. 4, a first switching circuit 21a is interposed between the first CPU 10a and the first drive circuit 11a, and a second switching circuit 21c is interposed between the second CPU 10b and the second drive circuit 11b. Output command signals from the first CPU 10a and the second CPU 10b are input into the first switching circuit 21a, and a switch acting as switching means selectively connected to one of the output command signals of the first CPU 10a and the second CPU 10b is incorporated. In the same way, output command signals from the second CPU 10b and the first CPU 10a are input into the second switching circuit 21c, and a switch acting as switching means selectively connected to one of the output command signals of the second CPU 10b and the first CPU 10a is incorporated.

An output terminal of the first switching circuit 21a is normally switched so as to be connected to the first CPU 10a, and an output terminal of the second switching circuit 21c is normally switched so as to be connected to the second CPU 10b. Switching of the first switching circuit 21a can be changed by a first switching signal 21b from the first CPU 10a. Switching of the second switching circuit 21c can be changed by a second switching signal 21d from the second CPU 10b.

Other configurations are the same as in the case of the electric power steering apparatus according to the first embodiment.

By the first switching circuit 21a and second switching circuit 21c being provided as heretofore described, electric motor drive can be continued by a drive of the CPU of the other control system when an abnormality occurs in a CPU or a region other than an output system-related circuit belonging to one control system. For example, when the first CPU 10a detects an abnormality in a control amount, an output command, or the like, of the control system of the first CPU 10a itself, that is, when output system-related circuits of the control system of the first CPU 10a itself are normal but an abnormality occurs in another region of the control system of the first CPU 10a itself, the drive of the electric motor 2 can be continued based on an output command of the second CPU 10b belonging to the other control system, via the output system-related circuits of the control system of the first CPU 10a in which the abnormality has occurred. Because of this, provided that the output system-related circuits are normal, the drive of the electric motor can be continued in practically the same way as normal, even when, for example, the CPU itself becomes abnormal.

As the first switching circuit 21a and the second switching circuit 21c are connected to the CPU of the control system to which the switching signal itself belongs, the first switching circuit 21a and the second switching circuit 21c are not switched by one-directional, for example high level or low level, voltage signals, but rather are switched to a normal side by on/off signals in a predetermined cycle, and switch so as to be connected to the CPU of the other control system when the on/off signal of the predetermined cycle is not input, because of which the first switching circuit 21a and the second switching circuit 21c can include a switching function that can respond when there is an abnormality in the CPU itself.

Figure 5A:
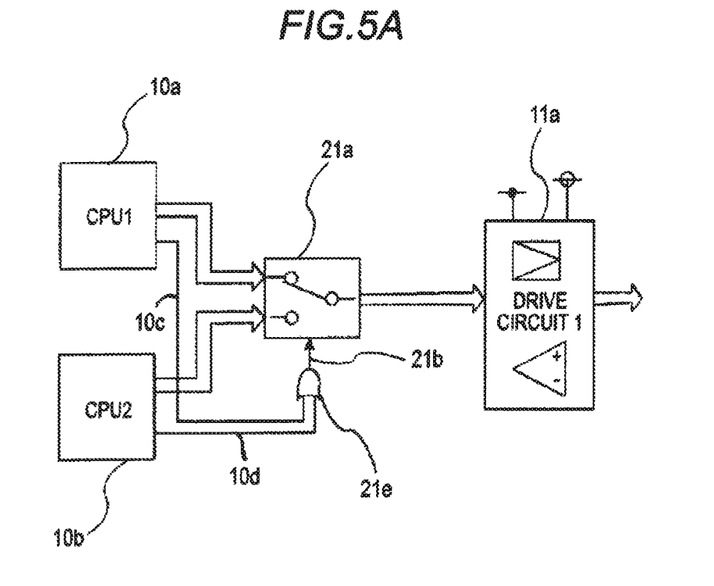
FIG. 5A is a partial configuration diagram of an electric power steering apparatus according to a modified example of the third embodiment of the invention.

FIG. 5A is a partial configuration diagram of an electric power steering apparatus according to a modified example of the third embodiment of the invention. The modified example shown in FIG. 5A shows a modified example of a switching circuit, and although the first switching circuit 21a is shown as an example, the second switching circuit 21c can also be configured in the same way. In FIG. 5A, the first switching signal 21b to the first switching circuit 21a is output from a first OR circuit 21e. Of two input terminals in the first OR circuit 21e, a first command signal is input into one input terminal from the first CPU 10a, and a second command signal is input into the other input terminal from the second CPU 10b.

Figure 5B:
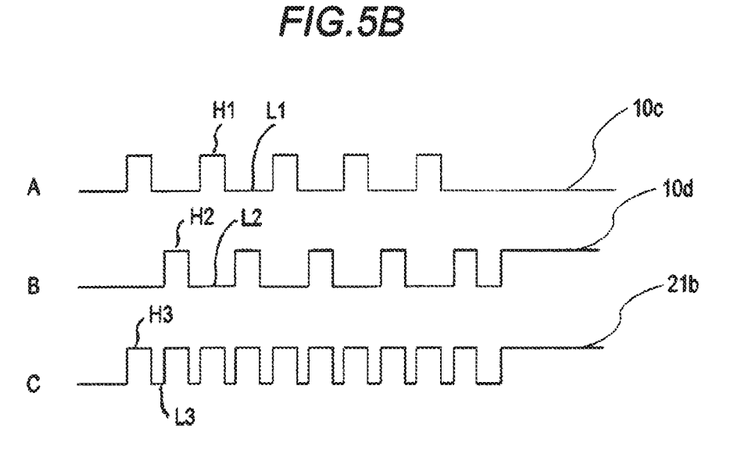
FIG. 5B is a waveform diagram showing an operation of the electric power steering apparatus according to the modified example of the third embodiment of the invention.

FIG. 5B is a waveform diagram showing an operation of the electric power steering apparatus according to the modified example of the third embodiment of the invention, wherein A indicates a first command signal 10c output from the first CPU 10a, B indicates a second command signal 10d output from the second CPU 10b, and C indicates the first switching signal 21b output from the first OR circuit 21e. The first command signal 10c indicated by A is such that a high level H1 section and a low level L1 section longer than the high level H1 section are alternately repeated in a predetermined cycle. The second command signal 10d indicated by B is generated in the same predetermined cycle as that of the first command signal 10c, and in a phase deviating with respect to the first command signal 10c, wherein a high level H2 section and a low level L2 section longer than the high level H2 section are alternately repeated.

As indicated by A and B in FIG. 5B, the first command signal 10c and the second command signal 10d are generated with phase differences so that the high level H2 section of the second command signal 10d occurs at a time when the first command signal 10c is in the low level L1 section, and the high level H1 section of the first command signal 10c occurs at a time when the second command signal 10d is in the low level L2 section.

As indicated by C in FIG. 5B, the first switching signal 21b, which is the output of the first OR circuit 21e, is at a high level H3 when either one of the first command signal 10c and the second command signal 10d is at the high level, and is at a low level L3 when both the first command signal 10c and the second command signal 10d are at the low level. A configuration is such that provided the first CPU 10a and second CPU 10b are both normal, the first switching signal 21b is generated in a predetermined short cycle, as indicated by C in FIG. 5B, the first switching circuit 21a is connected to the first CPU 10a, and a control command from the first CPU 10a is input into the first drive circuit 11a.

Furthermore, a configuration is such that when the first CPU 10a is normal and generates the first command signal 10c indicated by A in FIG. 5B, and the second CPU 10b is abnormal and the high level H2 or low level L2 occurs continuously, the first switching signal 21b, which is the output of the first OR circuit 21e, becomes a signal identical to the first command signal 10c shown in FIG. 5B, in which case too, the first switching circuit 21a is connected to the first CPU 10a, and a control command from the first CPU 10a is input into the first drive circuit 11a.

In this way, provided that the first CPU 10a is normal, the first switching circuit 21a is connected to the first CPU 10a regardless of whether the second CPU 10b is normal or not, and a control command from the first CPU 10a is input into the first drive circuit 11a. Meanwhile, a configuration is such that when the first CPU 10a is abnormal and the high level H1 or low level L1 occurs continuously, the first switching circuit 21a is connected to the second CPU 10b, and a control command from the second CPU 10b is input into the first drive circuit 11a.

Also, when the first command signal 10c from the first CPU 10a and the second command signal 10d from the second CPU 10b are signals such that the high level H1 and the low level L1 both occur continuously, there is a high possibility that both CPUs are abnormal, because of which a configuration that includes a third mode contact such that the first switching circuit 21a is connected to neither CPU may be adopted.

Also, in order to check the cycle of the first switching signal 21b, a configuration can be such that, for example, a multiple of first switching signal 21b cycle measuring circuits are disposed, the cycle of the first switching cycle 21b is classified as "short", "long", or "intermediate", and the first switching circuit 21a is switched.

According to the electric power steering apparatus according to the third embodiment of the invention, as heretofore described, the device has a switching circuit in consideration of a time when a CPU is abnormal, whereby motor drive can be continued by effectively using output system circuits, even when the CPU itself is abnormal.

The invention not being limited to the electric power steering apparatus according to the first, second, and third embodiments, the configurations of the first to third embodiments can be combined as appropriate, a partial modification can be added to the configurations, or the configurations can be partially omitted, without departing from the scope of the invention.

REFERENCE SIGNS LIST

1 Control unit, 1a First control unit, 1b Second control unit, 2 Electric motor, 21 First armature winding, 22 Second armature winding, 3a First inverter circuit, 3b Second inverter circuit, 4a First control circuit unit, 4b Second control circuit unit, 5a First power supply relay switching element, 5b Second power supply relay switching element, 6a First filter, 6b Second filter, 61a First filter capacitor, 61b Second filter capacitor, 62a First filter coil, 62b Second filter coil, 7 Ignition switch, 8a First sensors, 8b Second sensors, 9 Battery, 10a First CPU, 10b Second CPU, 11a First drive circuit, 11b Second drive circuit, 12a First input circuit, 12b Second input circuit, 13a First power supply circuit, 13b Second power supply circuit, 14 Communication line, 15 Notification means, 16a First output circuit, 16b Second output circuit, 17a First rotation sensor, 17b Second rotation sensor, +B Battery positive electrode side terminal, GND Battery negative electrode side terminal, 21a First switching circuit, 21c Second switching circuit.

The invention claimed is:

1. An electric power steering apparatus having an electric motor that includes two mutually independent armature windings and assisting steering power of a driver who controls steering of a vehicle using a driving force of the electric motor, wherein
the electric power steering apparatus includes two controllers that drive the electric motor,
each of the two controllers includes a power supply circuit, an input circuit into which input information including at least steering torque applied to the steering of the vehicle by the driver is input, an inverter circuit configured so as to drive the electric motor, a drive circuit configured so as to drive the inverter circuit, and a CPU that inputs a control command based on a control amount computed based on the input information output from the input circuit into the drive circuit,
each power supply circuit is configured so as to supply power to the controller to which the power supply circuit belongs,
each CPU provided in the two controllers is configured so as to be able to acquire the input information of the controller to which the CPU does not belong, has an abnormality detecting function of detecting an abnormality related to the input information of the controller to which the CPU belongs and an abnormality related to information other than the input information, and is configured so as to transmit the control command to the drive circuit of the controller to which the CPU belongs at a normal time when none of the abnormalities is being detected,
when one CPU of the individual CPUs detects an abnormality related to the input information of the controller to which the CPU belongs,
the one CPU that detects an abnormality related to the input information is configured so as to compute a control amount using the input information of the controller to which the CPU does not belong, and transmit a control command based on the computed control amount to the drive circuit in the controller to which the CPU belongs, and the other CPU, which is not detecting an abnormality related to the input information, is configured so as to continuously transmit a control command equivalent to that at the normal time to the drive circuit in the controller to which the CPU belongs,
when one CPU of the individual CPUs detects an abnormality related to information other than the input information of the controller to which the CPU belongs,
the one CPU that detects an abnormality related to information other than the input information is configured so as to transmit a control command to carry out either a stopping or a continuation of a drive of the electric motor in accordance with a level of the detected abnormality to the drive circuit in the controller to which the CPU belongs, the other CPU, which is not detecting an abnormality related to information other than the input information, is configured so as to transmit a control command in accordance with the level of the abnormality detected by the one CPU to the drive circuit in the controller to which the CPU belongs, and
each drive circuit provided in the two controllers is configured so as to drive the inverter circuit to which the drive circuit belongs so as to control the electric motor based on the transmitted control command.

2. The electric power steering apparatus according to claim 1, wherein
each of the two controller has a power supply relay that supplies power to the inverter circuit provided in the controller of the power supply relay, and
when one CPU of the individual CPUs in the two controllers detects an abnormality that necessitates stopping the drive of the electric motor,
the one CPU that detects an abnormality that necessitates stopping the drive of the electric motor is configured so as to transmit a control command stopping the electric motor to the drive circuit provided in the controller to which the CPU belongs, and
the other CPU, which is not detecting an abnormality that necessitates stopping the drive of the electric motor, is configured so as to output a signal turning off the power supply relay in the controller to which the CPU does not belong.

3. The electric power steering apparatus according to claim 2, including a notification device that notifies the driver of the existence or otherwise of an abnormality, wherein the notification device can be caused to operate by the CPU in either of the controllers, regardless of the level of the detected abnormality, when the abnormality is detected.

4. The electric power steering apparatus according to claim 1, wherein
each of the drive circuits provided in the two controllers has an inhibitor terminal that stops output of the drive circuit, and
when one CPU of the individual CPUs in the two controllers detects an abnormality that necessitates stopping the drive of the electric motor,
the one CPU that detects an abnormality that necessitates stopping the drive of the electric motor is configured so as to transmit a control command stopping the electric motor to the drive circuit in the controller to which the CPU itself belongs, and
the other CPU, which is not detecting an abnormality that necessitates stopping the drive of the electric motor, is configured so as to transmit an output stopping signal to the inhibitor terminal of the drive circuit in the controller to which the CPU does not belong.

5. The electric power steering apparatus according to claim 4, including a notification device that notifies the driver of the existence or otherwise of an abnormality, wherein the notification device can be caused to operate by the CPU in either of the controllers, regardless of the level of the detected abnormality, when the abnormality is detected.

6. The electric power steering apparatus according to claim 1, wherein
each of the two controllers includes a switching circuit interposed between the CPU and the drive circuit, and
each of the switching circuits is configured so as to receive a switching signal from the CPU of the controller to which the switching circuit belongs or a switching signal from the CPU of the controller to which the switching circuit does not belong, select one of a control command from the CPU of the controller to which the switching circuit itself belongs or a control command from the CPU of the control unit to which the switching circuit itself does not belong, and input the selected control command into the drive circuit of the controller to which the switching circuit belongs.

7. The electric power steering apparatus according to claim 6, including a notification device that notifies the driver of the existence or otherwise of an abnormality, wherein the notification device can be caused to operate by the CPU in either of the controllers, regardless of the level of the detected abnormality, when the abnormality is detected.

8. The electric power steering apparatus according to claim 1, wherein when one CPU of the individual CPUs in the two control units detects an abnormality related to information other than the input information, the one CPU that detects an abnormality related to information other than the input information is configured so as to, when the level of the detected abnormality are such that the drive of the electric motor is to be continued, transmit a control command causing the electric motor to generate a driving force equivalent to that at the normal time to the drive circuit of the controller to which the CPU belongs, or transmit a control command causing the electric motor to generate a driving force of a level reduced from that at the normal time to the drive circuit of the controller to which the CPU belongs, in accordance with the level of the abnormality, and the other CPU, which is not detecting an abnormality related to information other than the input information, is configured so as to transmit a control command equivalent to that at the normal time to the controller to which the CPU belongs, or transmit a control command causing the electric motor to generate a driving force that supplements the driving force of the reduced level to the drive circuit of the controller to which the CPU belongs, in accordance with the level of the abnormality related to information other than the input information detected by the one CPU.

9. The electric power steering apparatus according to claim 8, including a notification device that notifies the driver of the existence or otherwise of an abnormality, wherein the notification device can be caused to operate by the CPU in either of the controllers, regardless of the level of the detected abnormality, when the abnormality is detected.

10. The electric power steering apparatus according to claim 1, wherein
the individual CPUs in the two controllers are connected to each other via the individual input circuits.

11. The electric power steering apparatus according to claim 10, including a notification device that notifies the driver of the existence or otherwise of an abnormality, wherein the notification device can be caused to operate by the CPU in either of the controllers, regardless of the level of the detected abnormality, when the abnormality is detected.

12. The electric power steering apparatus according to claim 1, wherein
the individual CPUs in the two controllers are configured so as to be connected to each other via a communication line, and be able to exchange information with each other via the communication line.

13. The electric power steering apparatus according to claim 12, including a notification device that notifies the driver of the existence or otherwise of an abnormality, wherein the notification device can be caused to operate by the CPU in either of the controllers, regardless of the level of the detected abnormality, when the abnormality is detected.

14. The electric power steering apparatus according to claim 1, wherein
information from at least one of the individual drive circuits and the individual inverter circuits in the two controllers is also transmitted to the CPU of the control unit to which the drive circuit or inverter circuit does not belong.

15. The electric power steering apparatus according to claim 14, including a notification device that notifies the driver of the existence or otherwise of an abnormality, wherein the notification device can be caused to operate by the CPU in either of the controllers, regardless of the level of the detected abnormality, when the abnormality is detected.

16. The electric power steering apparatus according to claim 1, including a notification device that notifies the driver of the existence or otherwise of an abnormality, wherein the notification device can be caused to operate by the CPU in either of the controllers, regardless of the level of the detected abnormality, when the abnormality is detected.

* * * * *